US008989977B1

(12) United States Patent
Li et al.

(10) Patent No.: US 8,989,977 B1
(45) Date of Patent: Mar. 24, 2015

(54) HILL ROLLBACK SPEED CONTROL

(71) Applicant: Robert Bosch GmbH, Stuttgart (DE)

(72) Inventors: Qingyuan Li, Ann Arbor, MI (US);
George Thomas, Westland, MI (US);
Ravikumar Bhadange, Farmington, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/029,269

(22) Filed: Sep. 17, 2013

(51) Int. Cl.
G06F 7/00 (2006.01)
B60W 10/184 (2012.01)
B60W 10/11 (2012.01)

(52) U.S. Cl.
CPC ............. B60W 10/184 (2013.01); B60W 10/11 (2013.01)
USPC ............................... 701/65; 701/53

(58) Field of Classification Search
CPC ................ B60W 30/18109; B60W 30/18118; B60W 2520/06; B60W 2540/12; B60W 2550/142
See application file for complete search history.

(56) References Cited

U.S. PATENT DOCUMENTS 7,206,682 B2 * 4/2007 Bodin et al. ..................... 701/67
8,123,659 B2 2/2012 Leibbrandt et al.
8,364,364 B1 1/2013 Tao et al.
8,412,436 B2 * 4/2013 Mallet et al. ..................... 701/83
8,579,765 B2 * 11/2013 Yu et al. ......................... 477/184
2009/0048063 A1 2/2009 Silveri et al.
2010/0262349 A1 * 10/2010 Braeuer ........................... 701/70
2012/0187750 A1 7/2012 Kish et al.
2013/0197731 A1 * 8/2013 Schum et al. ................... 701/22

FOREIGN PATENT DOCUMENTS

EP 1535813 6/2005
EP 1607650 12/2005
EP 2025972 2/2009

OTHER PUBLICATIONS

PCT International Search Report and Written Opinion for Application No. PCT/US2014/048708 dated Nov. 4, 2014 (10 pages).

* cited by examiner

Primary Examiner — David D Le
(74) Attorney, Agent, or Firm — Michael Best & Friedrich LLP

(57) ABSTRACT

A hill rollback control system and method for controlling a rollback speed of a motor vehicle with wheel brakes. Upon ascertaining that the vehicle is rolling back, the system and method determine, based on a grade angle of the terrain that the vehicle is traveling on and a temperature of a transmission, a target rollback speed for the vehicle. The target rollback speed is lower when the grade of the terrain is above a threshold value. Also, the target rollback speed is lower when the temperature of the transmission is above a threshold value. The actual rollback speed of the vehicle is set and maintained at the target rollback speed by applying the vehicle's wheel brakes.

20 Claims, 5 Drawing Sheets

HILL ROLLBACK SPEED CONTROL

BACKGROUND

The present invention relates to vehicle control. More particularly, embodiments of the invention relate to systems and methods to control a rollback speed of a vehicle.

Passenger and other vehicles may be equipped with systems that prevent the vehicle from rolling backward when the vehicle is located on a hill. For example, a vehicle may travel up a hill or an upward slope and come to stop at an intersection. At the intersection, the driver presses a brake pedal to keep the vehicle stopped. However, when continuing to travel, the brake pedal must be momentarily released. Because the vehicle is positioned on an incline, the vehicle may travel backwards.

In vehicles equipped with manual transmissions, it is known to equip the vehicle with a device that holds the vehicle brakes (for example, drum or disc brakes on the vehicle's wheels) until the clutch is at a friction point. Such a device is an example of a hill-hold control mechanism.

SUMMARY

While hill hold control is known generally, with the advent of more sophisticated transmissions, for example, dual dry-clutch transmission, more sophisticated mechanisms not just for hill-hold control, but hill rollback control would be useful. The invention provides, among other things, a module and method for controlling the rollback speed of a motor vehicle having wheel brakes based on the grade of the terrain and the temperature of the transmission.

In one embodiment, the invention provides a system for controlling a non-zero rollback speed of a motor vehicle with wheel brakes. The system includes a driving direction arbitration module that is configured to receive at least one of a wheel direction signal and a transmission output shaft sensor direction signal. The driving direction arbitration module outputs an actual direction driving signal. The system further includes a start/stop arbitration module configured to receive the actual direction signal and a gear shift signal. The start/stop arbitration module outputs a hill rollback control enable signal. The system further includes a vehicle speed limit module that is configured to receive a terrain grade angel signal. The vehicle speed limit module generates a target rollback speed signal of a first predetermined value if the value of the terrain grade angle signal is equal to or below a grade threshold. The vehicle speed limit module further generates a target rollback speed signal of a second predetermined value if the value of the terrain grade angle signal is above the grade threshold. The system further includes a vehicle brake control module that is configured to receive the hill rollback control enable signal, the target rollback speed signal, and a vehicle speed signal. The vehicle brake control module determines a brake control signal to apply the wheel brakes to maintain the rollback speed of the vehicle at a value of the target rollback speed signal.

In another embodiment, the invention provides a method of controlling a non-zero rollback speed of a vehicle having wheel brakes. A first sensor ascertains the direction that the vehicle is moving. A module determines if the vehicle is traveling in a direction opposite from a direction associated with a current state of a gear shift lever. A terrain grade angle sensor ascertains a grade angle of the terrain. The module sets a target rollback speed to a first predetermined value if the grade angle of the terrain is equal to or below a grade threshold. The module further sets the target rollback speed to a second predetermined value if the grade angle of the terrain is above the grade threshold. The method generates a braking signal to cause the vehicle to apply a value of pressure to the vehicle brakes. The first sensor ascertains the speed of the vehicle. The module adjusts the braking signal is the speed of the vehicle is not equal to the target rollback speed.

In yet another embodiment, the invention provides a system for controlling a non-zero rollback speed of a motor vehicle with wheel brakes. The system includes a driving direction arbitration module that is configured to receive at least one of a wheel direction signal and a transmission output shaft sensor direction signal. The driving direction arbitration module outputs an actual direction driving signal. The system further includes a start/stop arbitration module configured to receive the actual direction signal and a gear shift signal. The start/stop arbitration module outputs a hill rollback control enable signal. The system further includes a vehicle speed limit module that is configured to receive a terrain grade angel signal and a transmission temperature signal. The vehicle speed limit module generates a target rollback speed signal of a first predetermined value if the value of the terrain grade angle signal is equal to or below a grade threshold and the value of the transmission temperature signal is below a temperature threshold. The vehicle speed limit module further generates a target rollback speed signal of a second predetermined value if the value of the terrain grade angle signal is above the grade threshold and the value of the transmission temperature signal is below a temperature threshold. The vehicle speed limit module further generates a target rollback speed signal of a third predetermined value if the value of the terrain grade angle signal is equal to or below the grade threshold and the value of the transmission temperature signal is above a temperature threshold. The vehicle speed limit module further generates a target rollback speed signal of a forth predetermined value if the value of the terrain grade angle signal is above the grade threshold and the value of the transmission temperature signal is equal above the temperature threshold. The system further includes a vehicle brake control module that is configured to receive the hill rollback control enable signal, the target rollback speed signal, and a vehicle speed signal. The vehicle brake control module determines a brake control signal to apply the wheel brakes to maintain the rollback speed of the vehicle at a value of the target rollback speed signal.

In yet another embodiment, the invention provides a method of controlling a non-zero rollback speed of a vehicle having wheel brakes. A first sensor ascertains the direction that the vehicle is moving. A module determines if the vehicle is traveling in a direction opposite from a direction associated with a current state of a gear shift lever. A terrain grade angle sensor ascertains a grade angle of the terrain. A second sensor ascertains a temperature of a transmission in the vehicle. The module sets a target rollback speed to a first predetermined value if the grade angle of the terrain is equal to or below a grade threshold and the temperature of the transmission is equal to or below a temperature threshold. The module further sets the target rollback speed to a second predetermined value if the grade angle of the terrain is above the grade threshold and the temperature of the transmission is equal to or below the temperature threshold. The module sets a target rollback speed to a third predetermined value if the grade angle of the terrain is equal to or below the grade threshold and the temperature of the transmission is above the temperature threshold. The module further sets the target rollback speed to a fourth predetermined value if the grade angle of the terrain is above the grade threshold and the temperature of the transmission is above the temperature threshold. The method generates a braking signal to cause the vehicle to apply a value of pressure to the vehicle brakes. The first sensor ascertains the speed of the vehicle. The module adjusts the braking signal is the speed of the vehicle is not equal to the target rollback speed.

Other aspects of the invention will become apparent by consideration of the detailed description and accompanying drawings.

DETAILED DESCRIPTION

Figure 1:
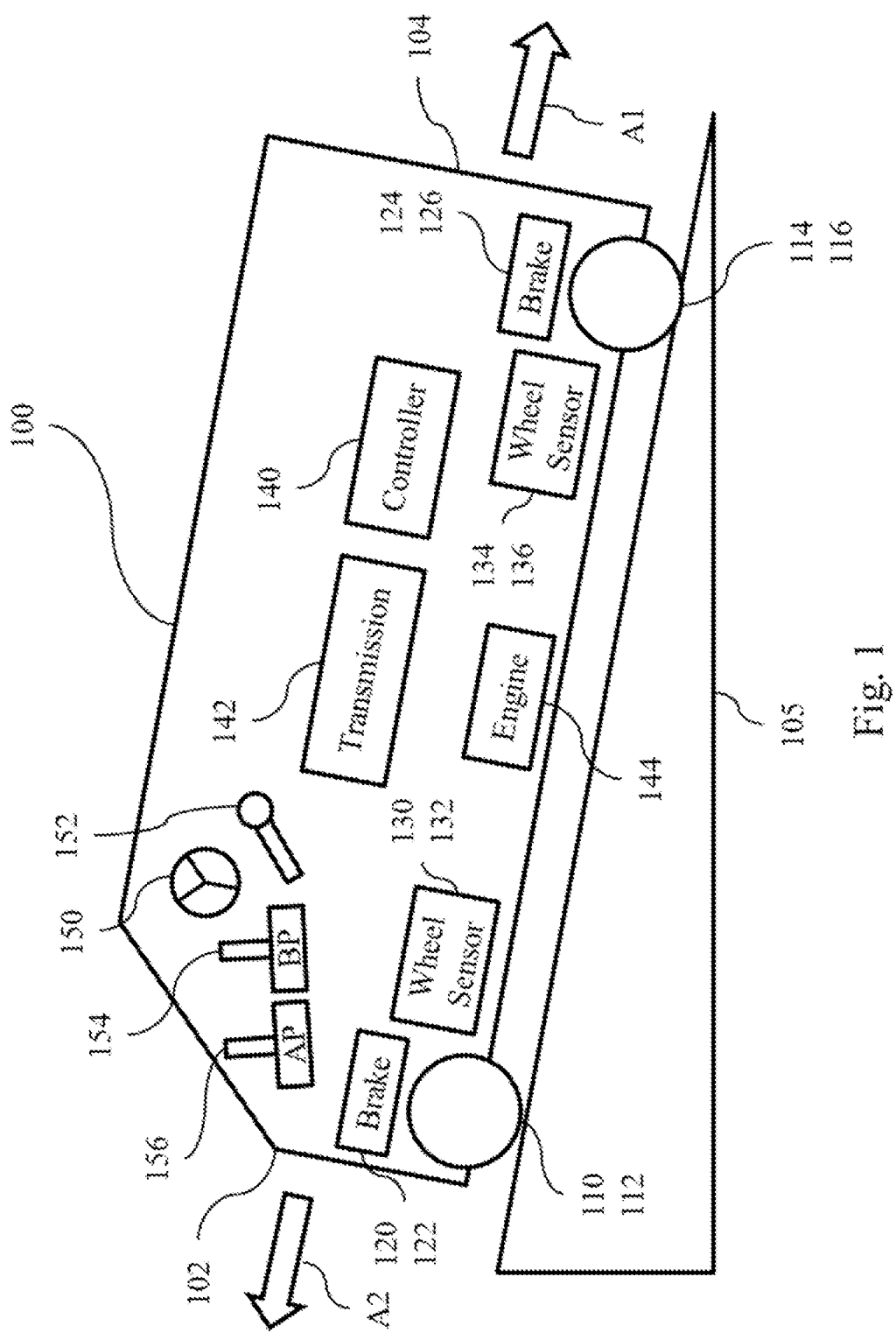
FIG. 1 illustrates a vehicle on an incline and movement of the vehicle in a direction that is opposite to the direction associated with a forward gear selection.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using other known means including direct connections, wireless connections, etc.

It should also be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention. Alternative configurations are possible.

FIG. 1 illustrates a vehicle 100 having a front 102 and a rear 104 on a terrain 105. In this embodiment, the terrain is an incline. The vehicle 100 includes four wheels 110, 112, 114, and 116. Each wheel is equipped with a brake (such as a disc brake or drum brake) 120, 122, 124, and 126, and four wheel sensors 130, 132, 134, and 136. A typical vehicle brake system is hydraulic. However, embodiments of the invention could be implemented with electrically-actuated brakes or other types of braking systems. The vehicle includes other components including a controller 140, a transmission 142, and an engine 144. In one embodiment, the controller 140 is part of vehicle brake and electronic stability control system such as the ESP® control system from Robert Bosch GmbH. A driver of the vehicle generates control inputs using a steering wheel 150, a gear shift lever 152, a brake pedal 154, and an accelerator pedal 156. Shifting of the gear shift lever generates a driver gear shift request signal (discussed below). Actuation of the brake pedal generates a driver brake request signal (also discussed below). Actuation of the accelerator pedal generates a driver acceleration signal (also discussed below).

When the vehicle 100 is on the terrain 105, gravitational forces act on the vehicle in such a manner that the vehicle will travel in the direction indicated by the arrow A1, unless an opposing force, such as torque generated by the engine 144 and transmitted to the wheels 110, 112, 114, and 116 of the vehicle or a braking force generated by the brakes 120, 122, 124, and 126, acts on the vehicle to, for example, maintain the vehicle in a stationary position or cause the vehicle to move in a forward direction, indicated by arrow A2. It should be understood that an uphill driving scenario or situation occurs when the front 102 of the vehicle is facing the crest of the incline and the vehicle is moving toward the crest. A downhill driving scenario or situation occurs when the back 104 of the vehicle is facing the crest of the incline and the vehicle is moving away from the crest. In an uphill driving scenario, where the vehicle is travelling in the direction of arrow A2, stops on the incline and remains stationary for some period of time, and thereafter resumes travel in the direction of arrow A2, there is a short period of time where it is possible for the vehicle to move in the direction of arrow A1, or rollback. This rollback is possible because there is a lag between the time when a driver releases the brakes (removes his or her foot from the brake pedal 154) to stop requesting actuation of the brakes (for example, a zero brake request signal) and the time that the driver uses the accelerator pedal 156 to make a torque request (for example, a non-zero driver acceleration signal) in which the actual torque generated in response to that request is sufficient to overcome the gravitational forces acting on the vehicle and move it forward in the direction of A2.

Figure 2:
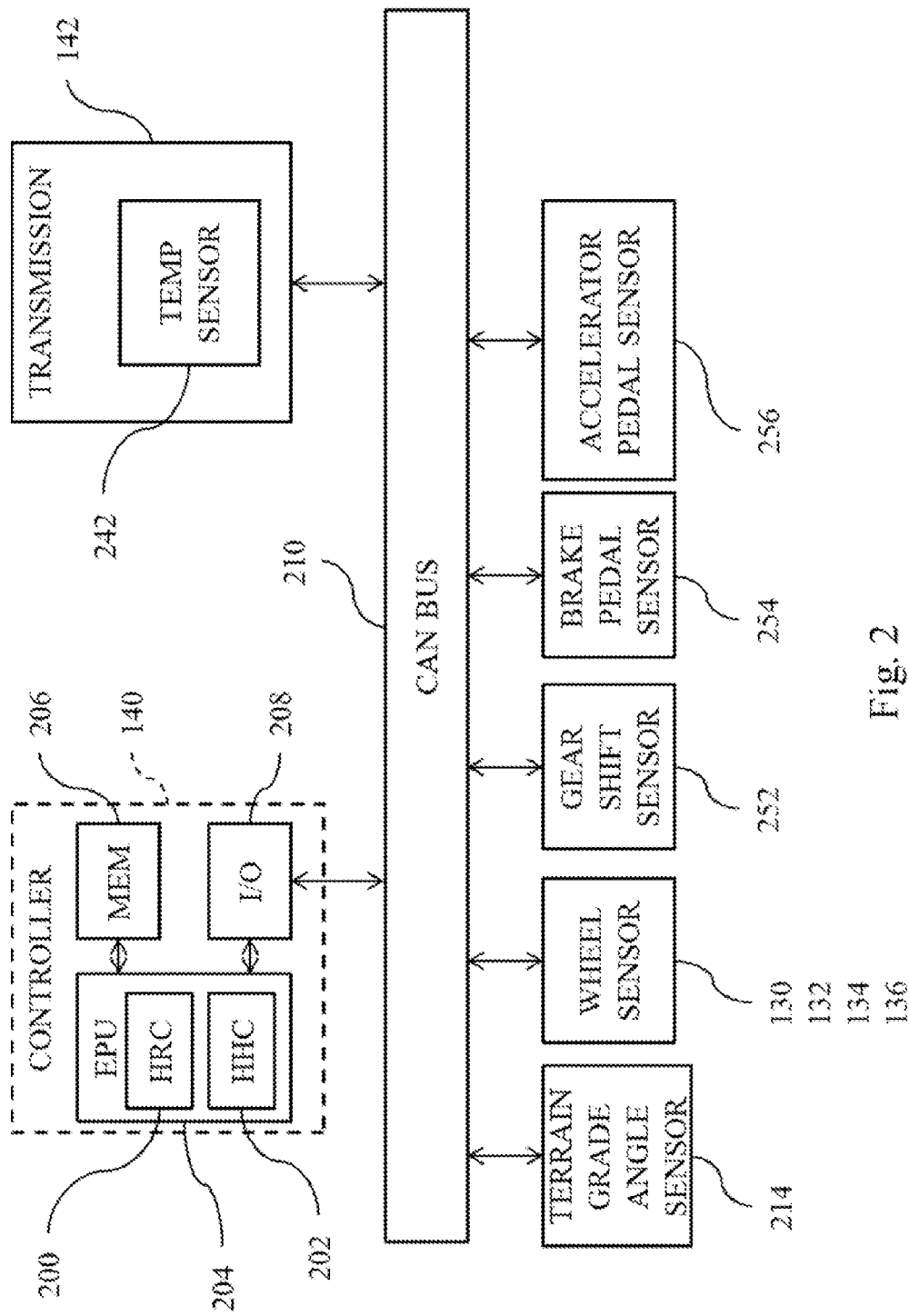
FIG. 2 illustrates a schematic of a hill rollback speed control system or module according to one embodiment of the invention.

FIG. 2 is a schematic illustration of a hill-rollback control ("HRC") module 200 according to one embodiment of the invention. In general terms, the HRC module maintains the rollback speed (i.e., a non-zero speed) of a vehicle 100 in uphill driving scenarios. The HRC module is located in the controller 140. The controller also includes a hill-hold control ("HHC") module 202, an electronic processing unit 204, a memory 206, and an input/output interface 208. The input/output interface connects the controller to external devices such as sensors. In one embodiment, the input/output interface is connected to a controller area network ("CAN") bus 210. A CAN bus is a known vehicle network through which various vehicle systems can transmit and receive information. The controller receives signals from a plurality of sensors. In one embodiment, communications between the controller and the sensors occur over the CAN bus. However, it is possible to connect the sensors (via wired or wireless connection) directly to the controller.

The plurality of sensors include: a terrain grade angle sensor 214, four wheel sensors 130, 132, 134, and 136, a transmission temperature sensor 242, a gear shift sensor 252, a brake pedal sensor 254, and an accelerator pedal sensor 256. The terrain grade angle sensor determines the grade angle of the terrain 105 that the vehicle 100 is traveling on. The wheel sensors determine the direction and speed that the wheels 110, 112, 114, and 116 are turning. The transmission temperature sensor is located in the transmission 142 and determines the temperature of the transmission. The gear shift sensor determines the position of the gear shift lever 152 (e.g., park (P), reverse (R), neutral (N), and drive (D) in an automatic transmission). The brake pedal sensor determines if the driver is actuating the brake pedal 154. The accelerator pedal sensor determines if the driver is actuating the accelerator pedal 156.

Figure 3:
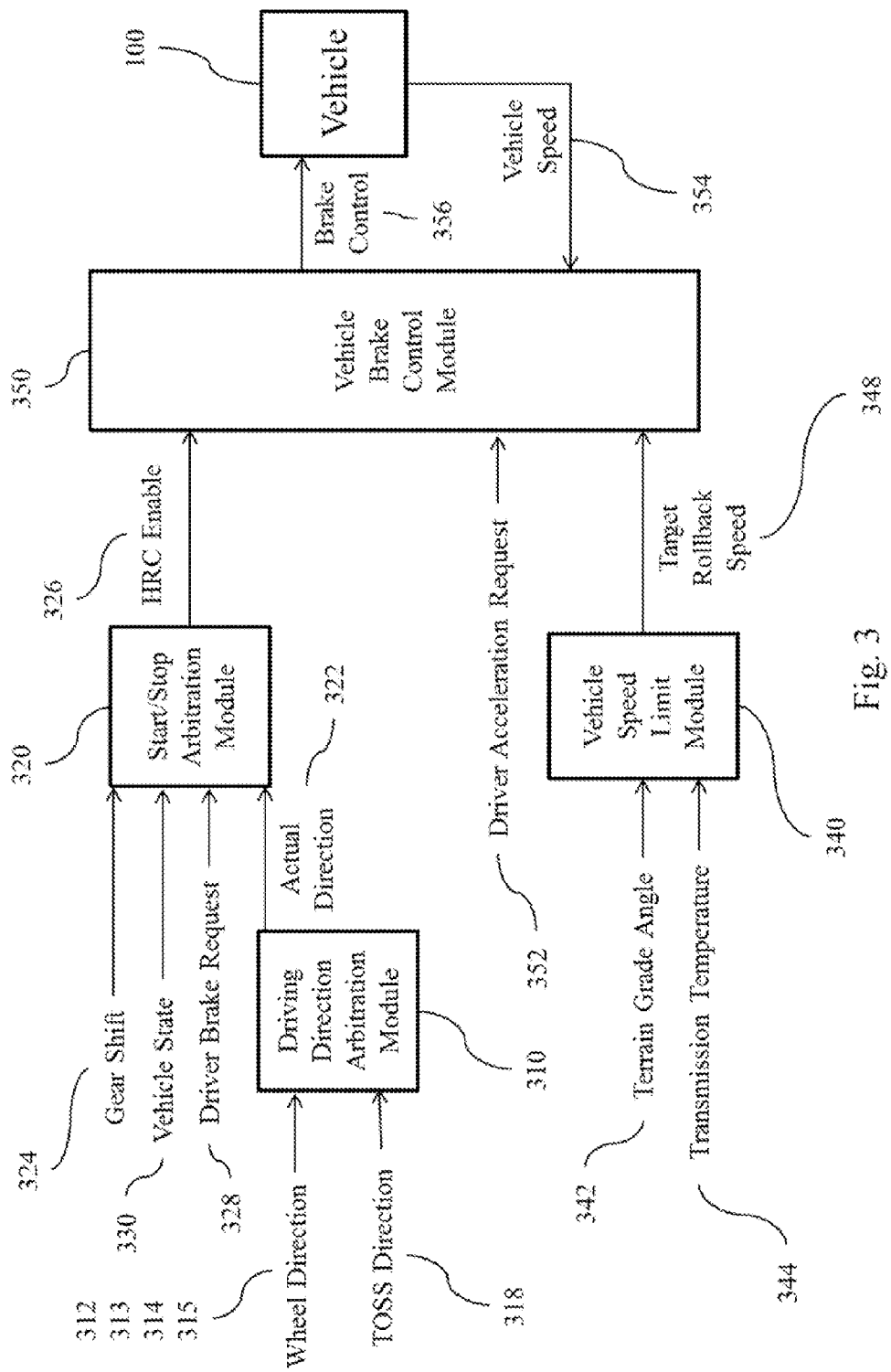
FIG. 3 illustrates the internal structure of a hill rollback speed control system or module according to one embodiment of the invention.

FIG. 3 illustrates the internal structure of a HRC module 200 according to one embodiment of the invention. The HRC module contains four sub-modules including a Driving Direction Arbitration Module ("DDAM") 310, a Start/Stop Arbitration Module ("SSAM") 320, a Vehicle Speed Limit Module ("VSLM") 340, and a Vehicle Brake Control Module ("VBCM") 350. The DDAM determines the actual direction that the vehicle 100 is moving. In one embodiment, the DDAM makes this determination using wheel direction signals 312, 313, 314, and 315 received from each of the wheel sensors 130, 132, 134, and 136. The wheel direction signals indicate the direction that each of the wheels 120, 122, 124, and 126 are turning. In another embodiment, the DDAM makes this determination using a transmission output shaft sensor ("TOSS") direction signal 318 received from a sensor in the transmission 142. The TOSS direction signal is an electrical signal that represents the direction of transmission output shaft rotation. In another embodiment, the DDAM receives and compares both the wheel direction signals and the TOSS direction signal to determine the direction that the vehicle is moving. The DDAM generates an actual direction signal 322 which represents the actual direction that the vehicle is moving.

The SSAM 320 determines if the HRC module 200 should be enabled. In one embodiment, the SSAM receives the actual direction signal 322 from the DDAM 310 and a gear shift signal 324 from the gear shift sensor 252. The SSAM uses the gear shift signal to determine the direction which the driver intends the vehicle 100 to move. For example, if the gear shift signal is set to DRIVE, then the direction that the driver intends the vehicle to move is forward (i.e., in the direction of arrow A2). If the actual direction signal indicates that vehicle is moving backward (i.e., in the direction of arrow A1) and the gear shift signal is set to DRIVE, the SSAM identifies that the vehicle is rolling back and the HRC module 200 should be enabled. The SSAM enables the HRC module by generating a HRC enable signal 326.

In another embodiment, the SSAM 320 additionally receives a driver brake request signal 328 from the brake pedal sensor 254. If the driver brake request signal indicates that the brake pedal 154 is actuated, the SSAM will not generate the HRC enable signal 326. In another embodiment, the SSAM 320 additionally receives a plurality of vehicle state signals 330. In one embodiment, the vehicle state signals include a brake overheat warning signal. In another embodiment, the vehicle state signals include a HHC brake request signal. If the SSAM receives the brake overheat warning signal or the HHC brake request signal, the SSAM will not generate the HRC enable signal 326.

The VSLM 340 determines a target rollback speed of the vehicle 100 for the HRC module 200 to maintain. In one embodiment, the VSLM receives a terrain grade angle signal 344 from the terrain grade angle sensor 214. If the grade angle of the terrain, represented by the terrain grade angle signal, is less than or equal to a grade threshold value, the VSLM sets the target rollback speed signal 348 to a first predetermined value, for example 6 kilometers per hour ("KPH"). Alternatively, if the grade angle of the terrain is greater than the grade threshold value, the VSLM sets the target rollback speed signal to a second predetermined value, for example 4 KPH. In some embodiments, the second predetermined value is less than the first predetermined value. In some embodiments, the second predetermined value is based on the exact value of grade angle.

In another embodiment, the VSLM 340 additionally receives a transmission temperature signal 342 from the transmission temperature sensor 242. If the grade angle of the terrain is less than or equal to the grade threshold value and the temperature of the transmission, represented by the transmission temperature signal, is greater than a temperature threshold value, the VSLM sets the target rollback speed signal 348 to a third predetermined value, for example 5 KPH. Alternatively, if the grade angle of the terrain is greater than the grade threshold value and the temperature of the transmission is greater than the temperature threshold value, the VSLM sets the target rollback speed signal to a fourth predetermined value, for example 3 KPH. In some embodiments, the third predetermined value is less than the first predetermined value and the fourth predetermined value is less than the first predetermined value.

The VBCM 350 determines the necessary pressure to apply the brakes 120, 122, 124, and 126 of the wheels 110, 112, 114, and 116 in order to maintain the rollback speed of the vehicle 100 at the value specified by the target rollback speed signal 348. The VBCM receives the HRC enable signal 326 from the SSAM 320, the target rollback speed signal from the VSLM 340, a driver acceleration request signal 352 from the accelerator pedal sensor 256, and a vehicle speed signal 354 from at least one of the wheel sensors 130, 132, 134, and 136. When the VBCM receives the HRC enable signal, it compares the vehicle speed signal to the target rollback speed signal. If the vehicle speed signal is not equal to the target rollback speed signal (i.e. the vehicle is rolling back faster or slower than the target rollback speed), the VBCM calculates the necessary force for the brakes to apply to the wheels in order to set the vehicle speed at the target speed, indicated by the target rollback speed signal. The VBCM causes the calculated force to be applied to the brakes by generating and transmitting a brake control signal 356 to the brakes. Additionally, the VBCM will not generate the brake control signal to apply pressure to the brakes if the driver acceleration request signal indicates that the driver is requesting enough torque for the vehicle to move in the forward direction of arrow A2.

Figure 4:
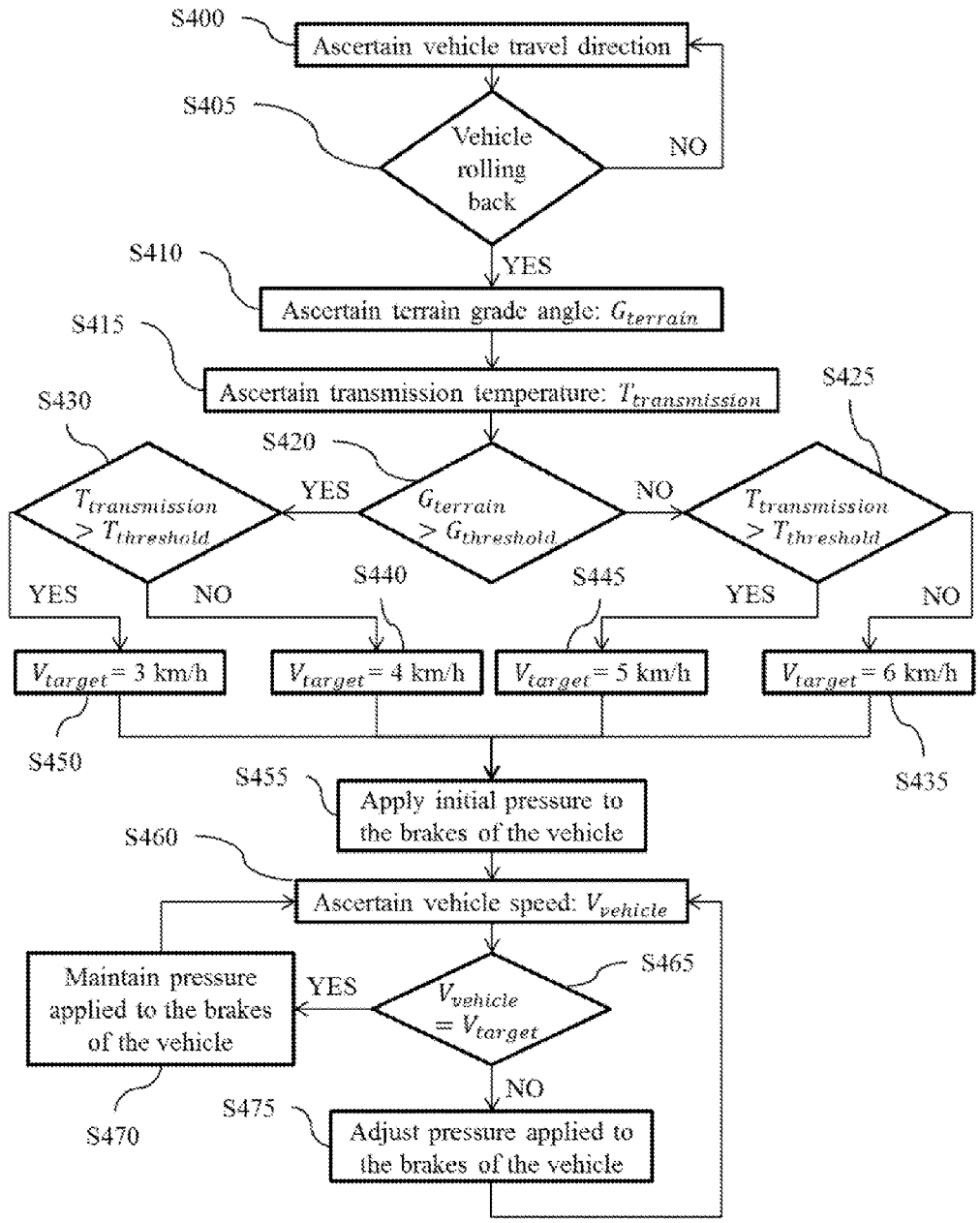
FIG. 4 illustrates an embodiment of the operation of the hill rollback speed control system or module as shown in FIG. 2.

FIG. 4 illustrates an embodiment of the operation of the HRC module 200 as shown in FIG. 2. First, the HRC module ascertains the direction that the vehicle 100 is moving in (S400). Then, the HRC module determines if the vehicle is rolling back (S405). If the vehicle is rolling back, the HRC module ascertains the grade angle of the terrain (S410). In some embodiments, the HRC module additionally ascertains the temperature of the transmission 142 (S415). Then the HRC module determines if the grade angle of the terrain is above than a grade threshold (S420). In some embodiment, the HRC module additionally determines if the temperature of the transmission is above than a temperature threshold (S425, S430). If the grade angle of the terrain is equal to or below the grade threshold and the temperature of the transmission is equal to or below the temperature threshold, the HRC module sets the target rollback speed to a first predetermined value (e.g., 6 KPH) (S435). Alternatively, if the grade angle of the terrain is above the grade threshold and the temperature of the transmission is equal to or below the temperature threshold, the HRC module sets the target rollback speed to a second predetermined value (e.g., 4 KPH) (S440). Alternatively, if the grade angle of the terrain is equal to or below the grade threshold and the temperature of the transmission is above the temperature threshold, the HRC module sets the target rollback speed to a third predetermined value (e.g., 5 KPH) (S445). Alternatively, if the grade angle of the terrain is above the grade threshold and the temperature of the transmission is above the temperature threshold, the HRC module sets the target rollback speed to a fourth predetermined value (e.g., 3 KPH) (S450). Next, in the some embodiments, the HRC module applies an initial pressure to the brakes 120, 122, 124, and 126 of the vehicle (S455). Then, the HRC module ascertains the speed of the vehicle (S460). Next, the HRC module determines if the speed of the vehicle is equal to the target rollback speed (S465). If the speed of the vehicle is equal to the target rollback speed, the HRC module maintains the pressure applied to the brakes of the vehicle (S470). If the speed of the vehicle is not equal to target rollback speed, the HRC module adjusts the pressure applied to the brakes of the vehicle (S475). It is to be understood that the HRC module increases the pressure applied to the brakes if the speed of the vehicle is above the target rollback speed and decreases the pressure applied to the brakes of the vehicle of the speed of the vehicle is below the target rollback speed.

Figure 5:
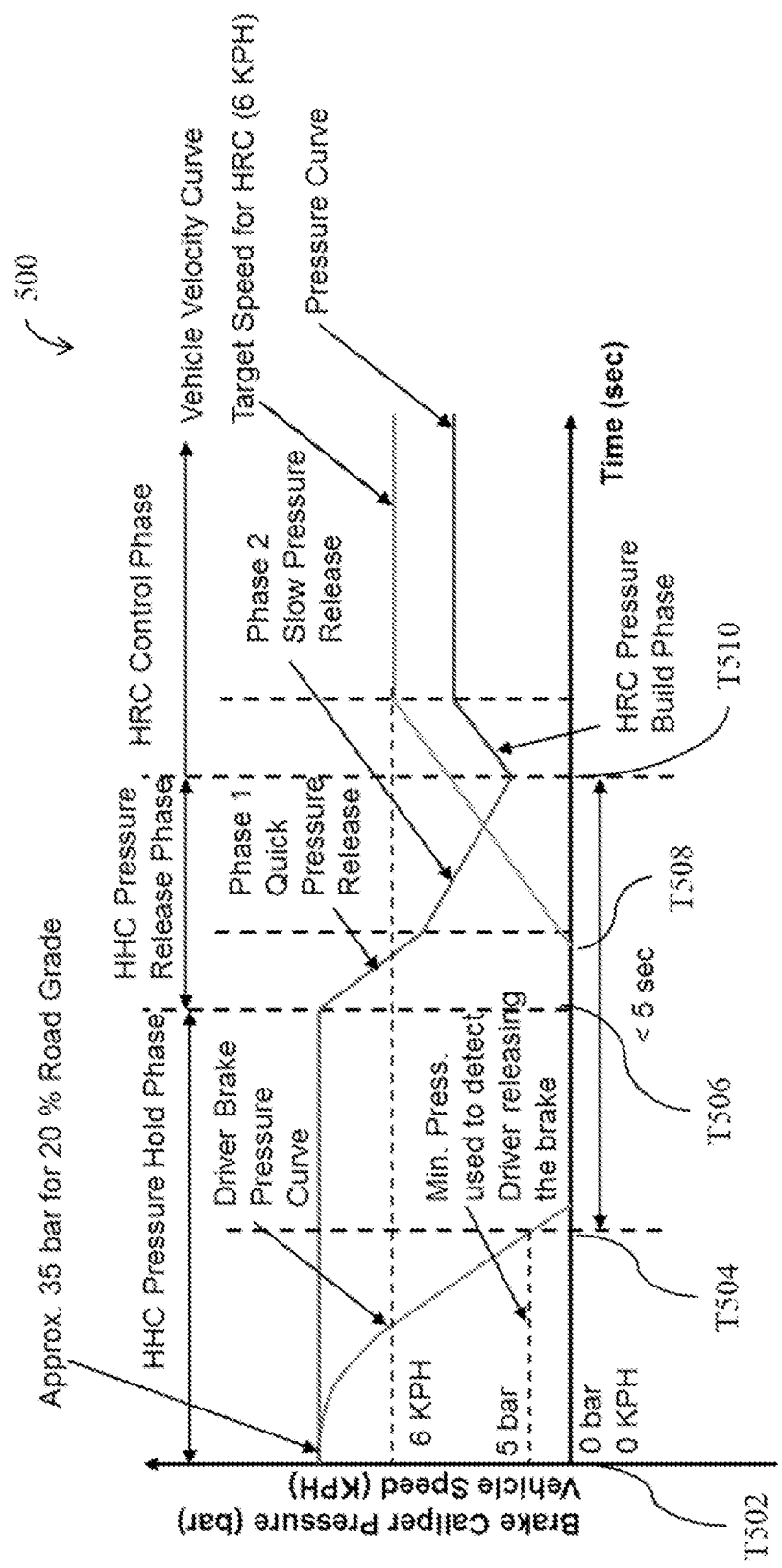
FIG. 5 is a graphical illustration of how a hill rollback speed control system or module operates in cooperation with a hill hold control module.

FIG. 5 graphically illustrates how the HRC module 200 operates in cooperation with the HHC module 202. The horizontal axis of the graph 500 represents time with units in seconds. The vertical axis of the graphs represents both brake caliper pressure with units in bars and the speed of the vehicle 100 with units in KPH. The driver releases the brake pedal 154 and the pressure applied to the brakes 120, 122, 124, and 126 as a result of the driver input decreases as shown in graph (T502). Even though the driver is not pressing on the brake pedal, the vehicle does not move because the HHC module is applying pressure to the brakes. When the pressure applied to the brakes as a result of the driver pressing on the brake pedal reaches a minimum value of 5 bar, the HHC module ascertains that the driver has released the brake pedal (T504). After a set delay period, the HHC module releases the pressure applied to the brakes in two phases (T506). The pressure applied to the brakes by the HHC module reaches a minimum value when it is insufficient to overcome the force of gravity and the vehicle begins to rollback (T508). The pressure applied to the brakes by the HHC module reaches a minimum value at which time the HRC module detects that the vehicle is rolling back. The HRC module then starts to apply pressure to the brakes in order to maintain the vehicle at a target speed of 6 KPH (T510).

Thus, the invention provides, among other things, a hill rollback control mechanism that controls a rollback speed of a vehicle based on a grade angle of a terrain and a temperature of a transmission. Various features and advantages of the invention are set forth in the following claims.

What is claimed is:

1. A system for controlling a rollback speed of a motor vehicle having wheel brakes, the system comprising:
   a driving direction arbitration module configured to receive a first signal and output an actual direction signal;
   a start/stop arbitration module configured to receive the actual direction signal and a gear shift signal, and generate a hill rollback control enable signal;
   a vehicle speed limit module configured to a receive a terrain grade angle signal, the vehicle speed limit module configured to set a target rollback speed signal to
      a first predetermined value if a value of the terrain grade angle signal is equal to or below a grade threshold, and
      a second predetermined value if the value of the terrain grade angle signal is above the grade threshold,
   a vehicle brake control module configured to
      receive the hill rollback control enable signal, the target rollback speed signal, and a vehicle speed signal, and
      determine a brake control signal to apply the wheel brakes to maintain the rollback speed of the vehicle at a value of the target rollback speed signal.

2. The system of claim 1, wherein the second predetermined value is less than the first predetermined value.

3. The system of claim 2, wherein the vehicle speed limit module is configured to receive a transmission temperature signal.

4. The system of claim 3, where the vehicle speed limit module is configured to set the target rollback speed signal to
   a third predetermined value if the value of the terrain grade angle signal is equal to or below the grade threshold and a value of the transmission temperature signal is above a temperature threshold, and
   a forth predetermined value if and the value of the terrain grade angle signal is above the grade threshold and the value of the transmission temperature signal is equal above the temperature threshold.

5. The system of claim 4, wherein the third predetermined value is less than the first predetermined value, the fourth predetermined value is less than the second predetermined value, and the fourth predetermined value is less than the third predetermined value.

6. The system of claim 1, wherein the first predetermined value and the second predetermined value are based on an exact value of the terrain grade angle signal.

7. The system of claim 1, wherein the first signal is at least one of a wheel direction signal and a transmission output shaft sensor direction signal.

8. The system of claim 1, wherein the start/stop arbitration module receives a driver brake request signal.

9. The system of claim 1, wherein the start/stop arbitration module receives a plurality of vehicle state signals.

10. The system of claim 9, wherein the plurality of vehicle state signals includes a brake overheat warning signal.

11. The system of claim 9, wherein the plurality of vehicle state signals includes a hill-hold control brake request signal.

12. The system of claim 1, wherein the vehicle brake control module receives a driver acceleration request signal.

13. A method for controlling a rollback speed of a vehicle having wheel brakes, the method comprising:
   ascertaining, with a first sensor, the direction that the vehicle is moving;
   determining, using a module, if the vehicle is traveling in a direction opposite from a direction associated with a current state of a gear shift lever;
   ascertaining, with a terrain grade angle sensor, a grade angle of the terrain;
   setting, using the module, a target rollback speed to
      a first predetermined value if the grade angle of the terrain is equal to or below a grade threshold, or
      a second predetermined value if the grade angle of the terrain is above the grade threshold,
   generating, using the module, a braking signal to cause the vehicle to apply a value of pressure to the vehicle brakes
   ascertaining, with the first sensor, the speed of the vehicle; and
   adjusting, using the module, the braking signal if the speed of the vehicle is not equal to the target rollback speed.

14. The method of claim 13, wherein the second predetermined value is less than the first predetermined value.

15. The method of claim 14, wherein the method ascertains, with a second sensor, a temperature of a transmission in the vehicle.

16. The method of claim 15, wherein the method sets, using the module, the target rollback speed to a third predetermined value if the grade angle of the terrain is equal to or below the grade threshold and the temperature of the transmission is above a temperature threshold; or a fourth predetermined value if the grade angle of the terrain is above the grade threshold and the temperature of the transmission is above the temperature threshold.

17. The method of claim 16, wherein the third predetermined value is less than the first predetermined value, the fourth predetermined value is less than the second predetermined value, and the fourth predetermined value is less than the third predetermined value.

18. The method of claim 13, wherein the first predetermined value and the second predetermined value are based on an exact value of the grade angle of the terrain.

19. The method of claim 13, wherein the first sensor is at least one of a plurality of wheel sensors and a transmission output shaft sensor.

20. The method of claim 15, wherein the second sensor is a temperature sensor.

* * * * *